United States Patent [19]

Chambers et al.

[11] 4,012,772
[45] Mar. 15, 1977

[54] CONVERSION OF COLOR TELEVISION SIGNALS TO OR FROM INTERLACED FORM

[75] Inventors: John Philip Chambers; Derek Thomas Wright, both of Copthorne, England

[73] Assignees: The Marconi Company Limited; Standard Telephone & Cables Limited, both of London, England

[22] Filed: Sept. 9, 1975

[21] Appl. No.: 611,673

[30] Foreign Application Priority Data

Sept. 13, 1974 United Kingdom ............ 40114/74

[52] U.S. Cl. .................................................. 358/11
[51] Int. Cl.[2] ........................................ H04N 9/42
[58] Field of Search ............... 178/DIG. 24; 358/11

[56] References Cited
UNITED STATES PATENTS 3,832,487 8/1974 deNiet ........................ 178/DIG. 24

Primary Examiner—Robert L. Richardson
Attorney, Agent, or Firm—Kemon, Palmer & Estabrook

[57] ABSTRACT

Sequential/interlace scan conversion of NTSC or PAL color television signals is effected by an encoder the output of which is connected to the input of scan conversion apparatus. Controllable phase shift means is included in either the color signal input or the subcarrier input of the encoder and is adapted to vary the phase of the modulated subcarrier for each line of the received color signal by an essentially integral number of quarter cycles in dependence upon the line number. The control is such that the conversion apparatus provides an encoded output signal with the color subcarrier in PAL or NTSC format. The invention can also be used in converting between different types of interlace systems.

6 Claims, 2 Drawing Figures

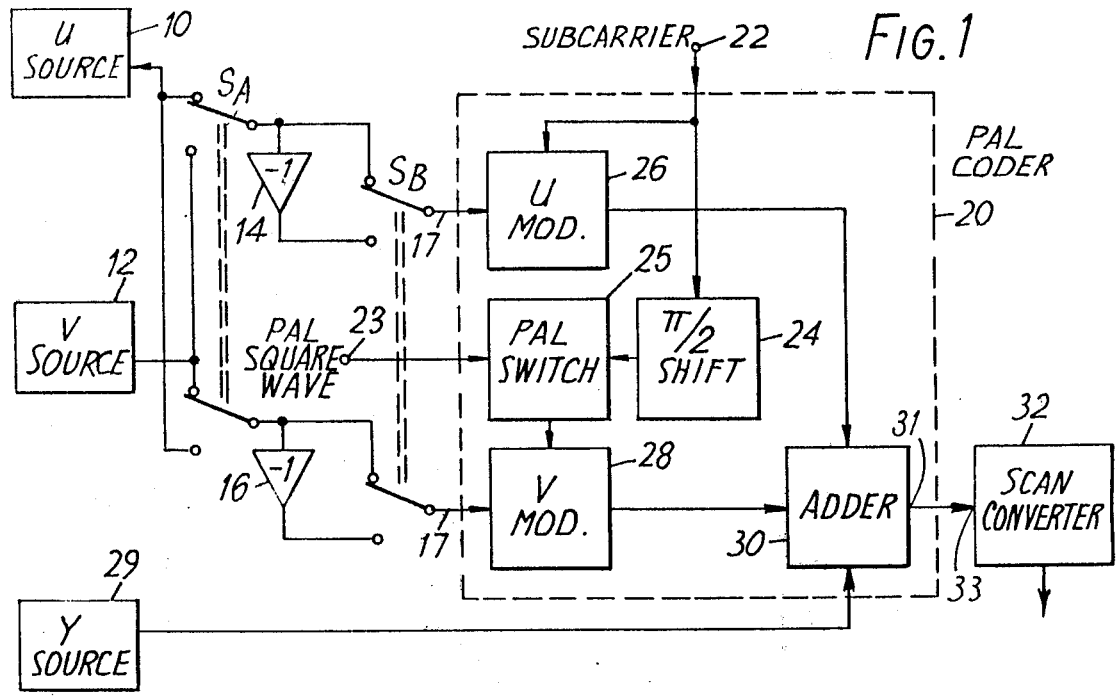
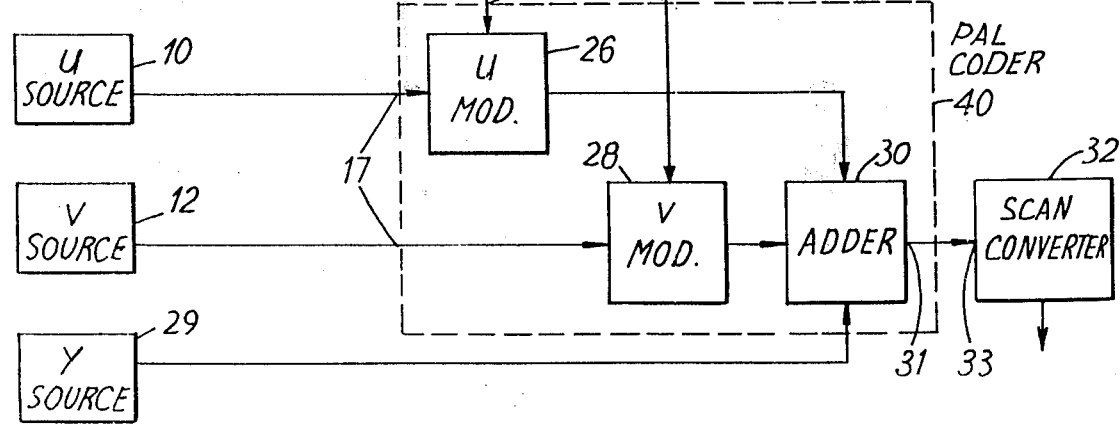

CONVERSION OF COLOR TELEVISION SIGNALS TO OR FROM INTERLACED FORM

This invention relates to the conversion of colour television signals to or from interlace form, by which is meant sequential-to-interlace or interlace-to-sequential conversion, or conversion between two different types of interlacing.

Conventional television signals are transmitted in interlaced form with each picture consisting of two fields the lines forming which are interlaced. They may however arise in sequential scan format, such as from a linear sensor array scanning a moving film. Also they may in certain circumstances be required for processing or display in sequential form. Occasions may arise when it is desired to convert to or from a multiple interlace system, for example a system in which each picture is formed from three or four fields the successive lines of which are interlaced.

British Pat. application No. 57035/72 (and corresponding German Published Application DT-OS 2,361,638) describes storage apparatus which can be used to effect sequential/interlace scan conversion of television signals. The apparatus can be used to handle monochrome and colour separation signals, or luminance and colour difference signals, prior to encoding by a PAL or NTSC encoder, but is not able to handle directly signals which are already so encoded, as the sequential/interlace conversion would in all these cases result in an incorrectly-coded output.

In the PAL system, for example, the coded signal comprises a luminance component $E'_y$, and two colour-difference signals $E'_u$ (known as the U-component) and $E'_v$ (the V-component) which are modulated onto separate subcarrier feeds in phase quadrature. The phase of the V-component (or its subcarrier) is reversed on alternate transmitted lines. Thus the instantaneous signal voltage $E_m$ is given by:

$$E_m = E'_y + E'_u \sin \omega t \pm E'_v \cos \omega t,$$

where $\omega$ is the chrominance subcarrier angular frequency.

Furthermore in the PAL system the subcarrier frequency is not an integral multiple of the line frequency. Thus for a conventional United Kingdom 625/50 signal (to which the figures in the subsequent description relate) there are 283¾ subcarrier cycles per line, plus one cycle per picture i.e. 1/625 of a cycle per line.

If an encoded PAL signal is applied to a sequential-/interlace scan converter, such as for example that of our aforementioned Application No. 57035/72, the subcarrier phase changes which exist between lines due to the V-component phase reversal, to the ¼ cycle subcarrier offset between adjacent lines, and to the ½ cycle subcarrier offset between adjacent fields, will each cause the output signal to have an incorrect subcarrier phase.

In the NTSC system there is no V-component phase reversal, and no subcarrier offset between adjacent fields, but there is a ½ cycle subcarrier offset between adjacent lines. This arises because the subcarrier frequency is 227½ times line frequency (for a 525/50 signal). In the NTSC system the so-called I and Q signals broadly correspond for the purposes of this invention to the U and V signals of the PAL system.

According to this invention we provide apparatus for the conversion of colour television signals to or from interlace form, and a PAL or NTSC colour encoder connected to the conversion apparatus and having inputs for receiving colour signals and subcarrier signals, wherein the output of the encoder is connected to the input of the conversion apparatus, and there being further included controllable phase shift means connected to one or more of the inputs of the encoder, which means is adapted to vary the phase of the modulated colour subcarrier for each line of received colour signals by substantially an integral number of quarter cycles in dependence upon the line number, whereby the output of the conversion apparatus provides an encoded output signal with the colour subcarrier in PAL or NTSC format.

The invention also provides a method of effecting such conversion.

The invention will now be described in more detail, by way of example, with reference to the accompanying drawing, in which:

FIG. 1 is a partially-block circuit diagram of one arrangement embodying the invention, and FIG. 2 is a similar circuit diagram of another arrangement embodying the invention.

The luminance component $E'_y$ of the signals does not interact with the chrominance components in $E'_u$ and $E'_v$, and will be ignored in the subsequent description as the luminance component can be correctly scan converted as it stands.

The behaviour of the U and V components of a PAL signal can conveniently be illustrated by tabulating the chrominance components of the instantaneous signal as $\omega t$ increases from 0 in steps of $\pi/2$. Because the subcarrier frequency is such that there are 283¾ + 1/625 cycles per line, the points of maximum U and V form an almost rectangular lattice, as the pattern is offset by substantially an integral number of quarter cycles between nearby lines of the same or nearby fields. Part of the pattern is given in the Table below.

TABLE

| Sequential line number | Interlace line number | Chrominance Component Maxima | Coder Inputs "U" | "V" | PAL Switch | Fig. 1 Switch Positions $S_A$ | $S_B$ | Fig. 2 Switch Positions $S_C$ | $S_D$ | $S_E$ |
|---|---|---|---|---|---|---|---|---|---|---|
| 45 | 23  | +U −V −U +V +U −V −U +V ... | +U | +V | + | + | + | + | + | + |
| 46 | 356 | +V −U −V +U +V −U −V +U ... | −U | −V | − | + | − | − | + | + |
| 47 | 24  | −V +U +V −U −V +U +V −U ... | +V | +U | + | − | + | + | + | − |
| 48 | 337 | +U −V −U +V +U −V −U +V ... | +V | +U | − | − | + | + | − | − |
| 49 | 25  | −U +V +U −V −U +V +U −V ... | −U | −V | 30 | + | − | − | − | + |
| 50 | 338 | −V +U +V −U −V +U +V −U ... | +U | +V | − | + | + | + | − | + |
| 51 | 26  | +V −U −V +U +V −U −V +U ... | −V | −U | + | − | − | − | − | − |
| 52 | 339 | −U +V +U −V −U +V +U −V ... | −V | −U | − | − | − | − | + | − |
| 53 | 27  | +U −V −U +V +U −V −U +V ... | +U | +V | + | + | − | + | + | + |
| 54 | 340 | +V −U −V +U +V −U −V +U ... | −U | −V | − | + | − | − | + | + |
| 55 | 28  | −V +U +V −U −V +U +V −U ... | +V | +U | + | − | + | + | + | − |
| 56 | 341 | +U −V −U +V +U −V −U +V ... | +V | +U | − | − | + | + | − | − |
| 57 | 29  | −U +V +U −V −U +V +U −V ... | −U | −V | + | + | − | − | − | + |

TABLE-continued

| Sequential line number | Interlace line number | Chrominance Component Maxima | Coder Inputs "U" | "V" | PAL Switch | Fig. 1 Switch Positions $S_A$ | $S_B$ | Fig. 2 Switch Positions $S_C$ | $S_D$ | $S_E$ |
|---|---|---|---|---|---|---|---|---|---|---|
| 58 | 342 | −V +U +V −U −V +U +V −U ... | +U | +V | − | + | + | + | − | + |
| 59 | 30 | +V −U −V +U +V −U −V +U ... | −V | −U | + | − | − | − | − | − |
| 60 | 343 | −U +V +U −V −U +V +U −V ... | −V | −U | − | − | − | − | + | − |

The Table shows the subcarrier and V-component phases required on each line during sequential scanning to give conventional PAL when interlaced. Because all the phase shifts of the pattern are multiples of a π/2 shift in ωt together with the complementing of the V component, they can be generated using a conventional PAL encoder and feeding the so-called U, V and PAL square wave inputs of the encoder in accordance with the Table.

Suitable apparatus for effecting the necessary phase shifts is illustrated in FIG. 1. U and V sources 10 and 12 are connected to a reversing or cross-over switch $S_A$ and then directly or through respective inverters 14 and 16 to selector switch $S_B$. The two outputs of switch $S_B$ are applied to inputs 17 of a PAL encoder 20 of conventional construction. The encoder also receives subcarrier at a subcarrier input 22 which it uses directly and through a π/2 phase shift circuit 24, and a PAL square wave or switching signal at an input 23.

The encoder 20 consists essentially of two balanced modulators 26 and 28 for the U and V components respectively, the outputs of which are combined together and with the luminance (Y) signal from a source 29 in an adder 30. The output 31 of the adder is applied to the input 33 of a sequential-to-interlace scan converter 32 which is of the type described in the aforementioned Application No. 57035/72 and has an output 35.

The operation of the switches $S_A$, $S_B$ and the PAL switch 25 is as illustrated in the Table, where the plus sign (+) indicates the upper positions of the switch arms and the reference V polarity (colour burst at 135°) and the minus sign (−) indicates the lower position and the alternative V polarity, respectively.

The function of the PAL switch can be performed outside the coder by a switch inverting the V input, in which case the internal PAL switch 25 would not be used. In FIG. 1, the phases of the U and V signals have been altered by inversion. Alternatively the phase of the subcarrier feed can be changed.

Both these modifications are illustrated in FIG. 2. Here the outputs of the U and V sources 10 and 12 are applied directly to the modulators 26 and 28 of PAL encoder 40. The feed from subcarrier source 22 is applied directly and through an inverter 42 to a selector switch $S_C$, and through a π/2 phase shift circuit 44 and thence directly and through an inverter 46 to a selector switch $S_D$. The outputs of selector switches $S_C$ and $S_D$ are applied to a reversing or cross-over switch $S_E$, the two outputs of which are applied as subcarrier inputs 48 to the U modulator 26 and the V modulator 28. The outputs of the modulators 26 and 28 are again added in adder 30 together with the luminance signal and applied to scan converter 32.

Because there is an odd number of lines per picture the PAL switch pattern repeats every two pictures. Therefore on alternate pictures the overall path of the V source, or its corresponding modulator subcarrier, must be of opposite polarity to that given in the Table.

The switching sequence shown in the Table for switches $S_B$, $S_C$ and $S_D$ can be different if different starting conditions are used. Thus the Table applies to one particular exemplary case, in which the subcarrier conditions between input and output for sequential line numbers 45, 53, 61 etc. are unaltered. Other tables would apply for other line numbers being unaltered (e.g. sequential line numbers 46, 54, 62 etc.). With the aid of the above Table the man versed in the art will be able to prepare the required table for his particular application.

The colour burst can be made as usual by injecting burst gate at the appropriate amplitude into the U and V components. The burst blanking sequence would, of course, be such that the correct sequence was produced after scan conversion.

The method described above has ignored the effect of the small one cycle per picture subcarrier offset of a PAL signal. This can be accommodated in several different ways. For example:

i. a subcarrier frequency which is half a cycle per picture lower in frequency than normal (i.e. 4.43360525 MHz with 625/50 PAL) could be used. The offset would be correct at the output as it would have been doubled by the interlacing. The processing of the lines could be based on timings with respect to the edges of the synchronising pulses.

ii. the line drive pulses used in the sources could be such that they occur every (283¾ + 1/1250) cycles of subcarrier (instead of 283¾ + 1/625) during the active fields with one or more marginally longer intervals between fields to make the correct overall period. The converter output would have conventional regular synchronising pulses.

iii. the control of the converter could be related to subcarrier rather than to line synchronising pulses. In this case there would be a slight distortion in the output picture; namely a uniform shear such that the bottom edge is moved to the right by about 1/500 of the picture width.

In all of these adjustments a small timing correction is taking place in the converter in addition to the overall retiming of the lines.

The above methods have been described with reference to an analogue PAL coder, although the signal may afterwards be converted to digital form, such as p.c.m., before scan conversion. When it is required to produce a digital output with regular clocks (no timing discontinuities between lines) and/or with sampling in a preferred phase relative to subcarrier, such as described in U.S. Pat. No. 3,891,994, it will generally be necessary to use clocks at the input which have discontinuities between lines. For example, the preferred phases of three times subcarrier frequency sampling require one sample in three at the +U or −U points of the Table. Although these points progress regularly from line to line of each field there are discontinuities between the adjacent picture lines which arise from sequential scanning. It would be necessary in such a case to make step changes in the sampling phase between lines, in this case, for example, by choosing a different phase of a master clock at twelve times subcarrier frequency (the lowest common multiple). Alternatively the line drive to the scanning circuits in the sources could be retimed on alternate lines to give the required offset between the regular shifts of the U samples on consecutive lines of each field. A different subcarrier frequency, such as (283 3/8 + 1/1250) times lines frequency, could be contrived to minimise this retiming at the expense of a small distortion in picture geometry.

These same considerations apply when the signals are to be directly PAL coded in apparatus such as described in British Pat. application No. 25223/73.

Similar considerations apply to the NTSC colour system although this is simpler as there is no picture frequency offset of subcarrier (it is exactly 455/2 times line frequency) and there is no equivalent of the alternate line switch. It is sufficient to reverse the polarity of both chrominance components (or the subcarrier feed) on alternate lines at the input coder to give a correct NTSC signal after sequential-to-interlace conversion.

While the above description has related to colour difference signals as the input signals to the encoder, the invention is also applicable where colour separation signals are directly applied to the encoder. Likewise the invention is applicable to conversion from sequential scan to multiple-interlace systems, such as triple or quadruple interlace, or to conversion from one interlace system to another.

We claim:

1. The combination comprising:
   scan conversion apparatus for the conversion of color television signals from sequential to interlace form or from interlace to sequential form or from one interlace form to another; and
   a PAL or NTSC color encoder connected to said conversion apparatus and having inputs for receiving color signals and subcarrier signals and modulation means connected to said inputs for quadrature modulating two received color signals onto said subcarrier signal;
   wherein the output of said encoder is connected to the input of said conversion apparatus, and there being further included controllable phase shift means connected to one or more of the inputs of said encoder, which means is adapted to vary the phase of the modulated color subcarrier for each line of received color signals by substantially an integral number of quarter cycles in dependence upon the line number, such that the output of said conversion apparatus provides an encoded output signal with the color subcarrier in PAL or NTSC format.

2. The combination according to claim 1, wherein said phase shift means is connected to the color signal input of the encoder.

3. The combination according to claim 1, wherein said phase shift means is connected to the subcarrier input of the encoder.

4. The combination according to claim 1, wherein said controllable phase shift means comprises controllable switches for switching between said one or more inputs of said encoder.

5. The combination according to claim 1, wherein said phase shift means comprises inverters for inverting said one or more inputs to said encoder.

6. A method of converting color television signals from sequential to interlace form or from interlace to sequential form or from one interlace form to another and providing a PAL of NTSC encoded output signal, by quadrature modulating two received color signals onto a subcarrier signal, wherein said signal is encoded prior to being converted, and at least one of the signals used in said encoding is phase shifted so as to vary the phase of the modulated subcarrier for each line of the received color signals by substantially an integral number of quarter cycles in dependence upon the line number, such that the output signal has its color subcarrier encoded in PAL or NTSC format.

* * * * *